May 15, 1923.
A. W. STANDFIELD
PRINTING FRAME FOR ROLL FILMS
Filed Dec. 13, 1921
1,455,308
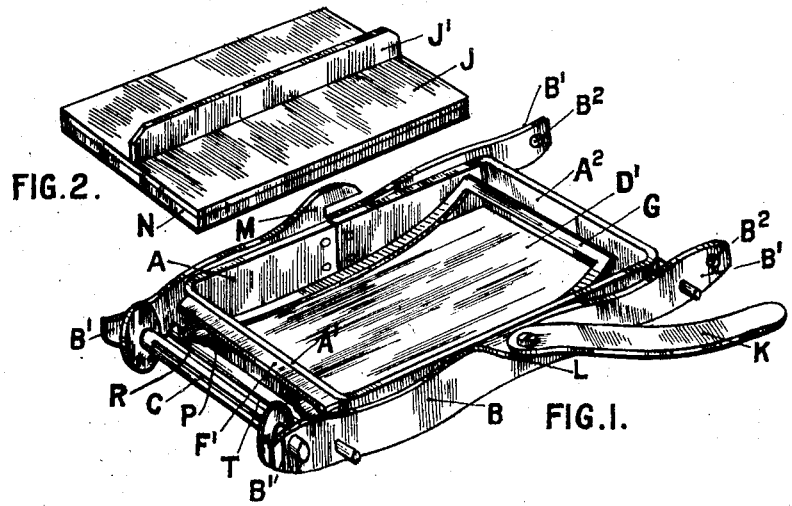
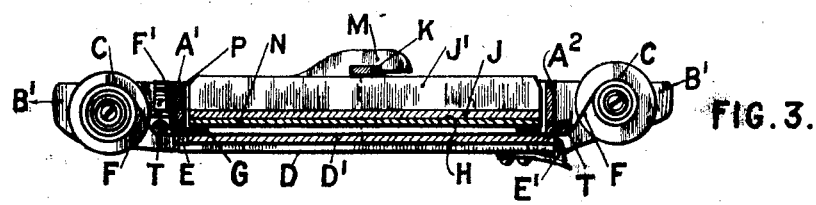
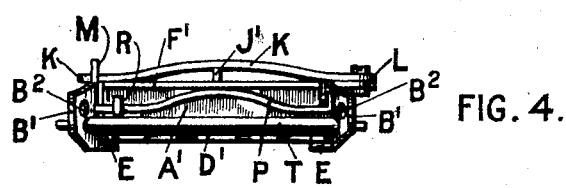
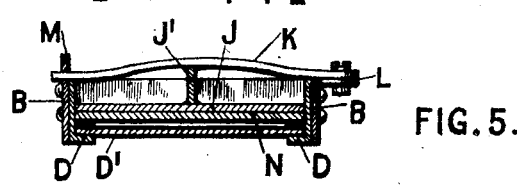

Patented May 15, 1923.

1,455,308

UNITED STATES PATENT OFFICE.

ARNOLD WESLEY STANDFIELD, OF SYDNEY, NEW SOUTH WALES, AUSTRALIA.

PRINTING FRAME FOR ROLL FILMS.

Application filed December 13, 1921. Serial No. 522,088.

*To all whom it may concern:*

Be it known that I, ARNOLD WESLEY STANDFIELD, a subject of the King of Great Britain and Ireland, and resident of "Myrtle" Wilson Street, Mascot, Sydney, in the State of New South Wales, Commonwealth of Australia, have invented certain new and useful Improvements in Printing Frames for Roll Films, of which the following is a specification.

This invention relates to printing frames for producing photographic prints from negatives on roll films, and has for its object a simple and convenient printing frame in which the film is used in the same form as in the camera, that is in roll form, so that it has not to be cut into sections on each of which is an individual negative, as has hitherto been the practice. A further object of the invention is a printing frame in which photographic prints may be made from all the negatives on a film in succession, and from any selected negative or negatives, without in any way destroying the continuity of the film or damaging it in any way.

My invention consists firstly in a frame comprising a rectangular box-shaped body, a removable spring-held back in said body, a sheet of glass covering one face of the body, and at each end of said body means for rotatably holding a spool disposed transversely to the body and so arranged that a film from one of said spools passed between the glass and the backing plate may be traversed and longitudinally by winding it on to the other spool. With this construction of frame any individual negative on the film or all of them in succession may be brought into the printing position, and the film being merely transferred wholly or partially from one spool to another is not liable to damage and is not cut into section but retains its complete form.

My invention also consists in a frame as aforesaid in which the spool holding means are constituted by pairs of spring lugs, each lug having a hole which serves as a bearing for the axial trunnion of the spool, said lugs being sprung apart for the insertion and release of the trunnions.

My invention further consists in a frame in which at each end there is provided a guide roller to protect the film from being damaged by contact with the edge of the body.

My invention further consists in the provision of a mask or vinette having an aperture of the desired dimensions and shape, said mask being formed of very thin spring metal held at one end to the body and normally spring pressed away from the glass and at the other end formed with a normal backward flex or curvature so that the sensitized print paper which is placed behind the mask is lifted from flat contact with the film when the back is removed. The mask which immediately underlies the film also serves to give a margin or border to the print.

My invention still further consists in such other novel features and combinations of parts as will be ascertained from the following description in which reference is made to the accompanying sheet of drawings provided for the purpose of facilitating a proper understanding of my invention, and in which—

Fig. 1 is a perspective view of a printing frame according to my invention, said frame being shown face downwards with the back removed and one film spool in position;

Fig. 2 is a perspective view of the back;

Fig. 3 is a longitudinal section of the frame showing both film spools in position, the film extended between them behind the glass, the back in position, and a sheet of print paper between the back and the film;

Fig. 4 is an end view of the frame with spool removed, and

Fig. 5 a transverse section of the frame.

The rectangular body or box A of the frame, which is made of strip metal has centrally riveted to its sides plate-spring members B the extremities of which extend beyond the ends of the body and constitute lugs B' having holes B$^2$ for the reception of the trunnions of spools C as shown in Figs. 1 and 3, said spools being inserted and released as required by springing opposite lugs B' apart.

The lower longitudinal edges of the sides of the body A are bent inwardly to constitute flanges D upon which is supported a sheet of glass D'. Fixed stops E are provided at one end of said flanges, while at the other end a spring catch E' takes over the end of the glass. The sheet of glass is of such length as to underlie the ends A' and A$^2$ of the body (see Fig. 3), and is releasably held between the stops E and catch E'.

The film F passes behind the glass from one spool C to the other, and a vinette or mask G of thin spring metal having any desired form of aperture (shown rectangular) is located immediately above the film, and on the mask is placed the sheet of sensitized paper H on which the print is to be made. The sensitized paper, mask and film are all pressed towards the glass by the back J neatly fitting in the body and resiliently held by a transverse plate spring K pivoted at one end on a lug L projecting from one of the spring members B, bearing at its middle on rib J' of the back, and releasably held at its other end under a lug M on the other spring member B. The under surface of the back is faced with a pad N of felt or the like.

One end of the mask G has a normal upward curve or flex as shown in Fig. 1 and, when the back is removed lifts the sensitized paper H and facilitates the handling thereof.

The other end of the mask is carried under and outside of the end A' of the body, and at its upper end is outwardly flanged as at F', said flange being upwardly pressed by means of a bow spring P fixed at one end to one of the spring members B and at the other end slidably held in a lug R projecting from the body end A'. This construction provides that while the mask is held in correct disposition at all times, it is, when the back is removed, automatically withdrawn from contact with the film so that the latter may be freely moved longitudinally as may be required. When however the back is pressed down by the plate spring K the mask is free to move against the tension of bow spring P into flat contact with the film.

The bow spring P extends sufficiently far through the lug R to ensure that it is not withdrawn from same when the lugs B' are spread to release or insert a spool.

Guide rollers T are provided at each end of the body for the purpose of ensuring that the film will not be damaged by scraping contact with the edges of the body ends or of the glass, said rollers are rotatably mounted in the lugs B' and their trunnions are of sufficient length to permit said lugs to be sprung apart without releasing the rollers.

The film is progressed longitudinally in either direction by rotating one or the other of the spools in a direction to wind the film thereon and unwind it from the other, and it will be seen that all or any selected negatives or negative may be brought singly into correct position for printing therefrom.

What I claim and desire to secure by Letters Patent is:—

1. A photographic printing frame comprising a box-shaped body having at each end means for rotatably supporting a film spool, a sheet of glass covering one face of the body and spaced from the adjacent edges of its ends so that the film may pass behind the glass from one spool to another, guide rollers at each end of the body to protect the film from scraping contact with the latter, a mask of thin spring material having at one end a normal outward flex, a spring normally pressing the other end of the mask away from the glass, and a releasably spring-pressed back fitting in the body and pressing the mask towards the glass.

2. In a photographic printing frame comprising a glass faced and box-shaped body having at each end means for rotatably supporting a film spool, a mask of thin spring material formed at one end with a normal outward flex and at the other end bent at a right angle to lie against the outside of one of the ends of the body and outwardly flanged at its extremity, and a bow spring bearing against said flange and pressing that end of the mask away from the glass.

3. A photographic printing frame comprising in combination, a box shaped body having means for rotatably supporting a film spool at each end, inwardly turned flanges on the lower edges of the side members of the body, a sheet of glass supported on said flanges, a fixed stop against which one end of the glass bears, a releasable catch taking against the other end of the glass, a thin metal mask fitting in said body and held at one end by means of a spring normally retracting said mask from the glass, said mask being formed at its other end with a normal outward flex, a back fitting in said body behind said mask, a releasable spring member pressing said back and mask towards the glass, and a guide roller at each end of the body, all constructed and arranged substantially as herein described.

Signed at Sydney this fourth day of November, A. D. 1921.

ARNOLD WESLEY STANDFIELD.